Aug. 5, 1952         A. M. HIRSH, JR         2,605,533
APPARATUS FOR APPLYING A CONTINUOUS LAYER OF CEMENTITIOUS
MATERIAL TO THE SURFACE OF A VERTICAL STRUCTURE
Filed May 20, 1950         4 Sheets—Sheet 1

INVENTOR.
Allan M. Hirsh, Jr.
Robert S. Dunham
ATTORNEY

INVENTOR.
Allan M. Hirsh, Jr.
BY
Robert S. Dunham
ATTORNEY

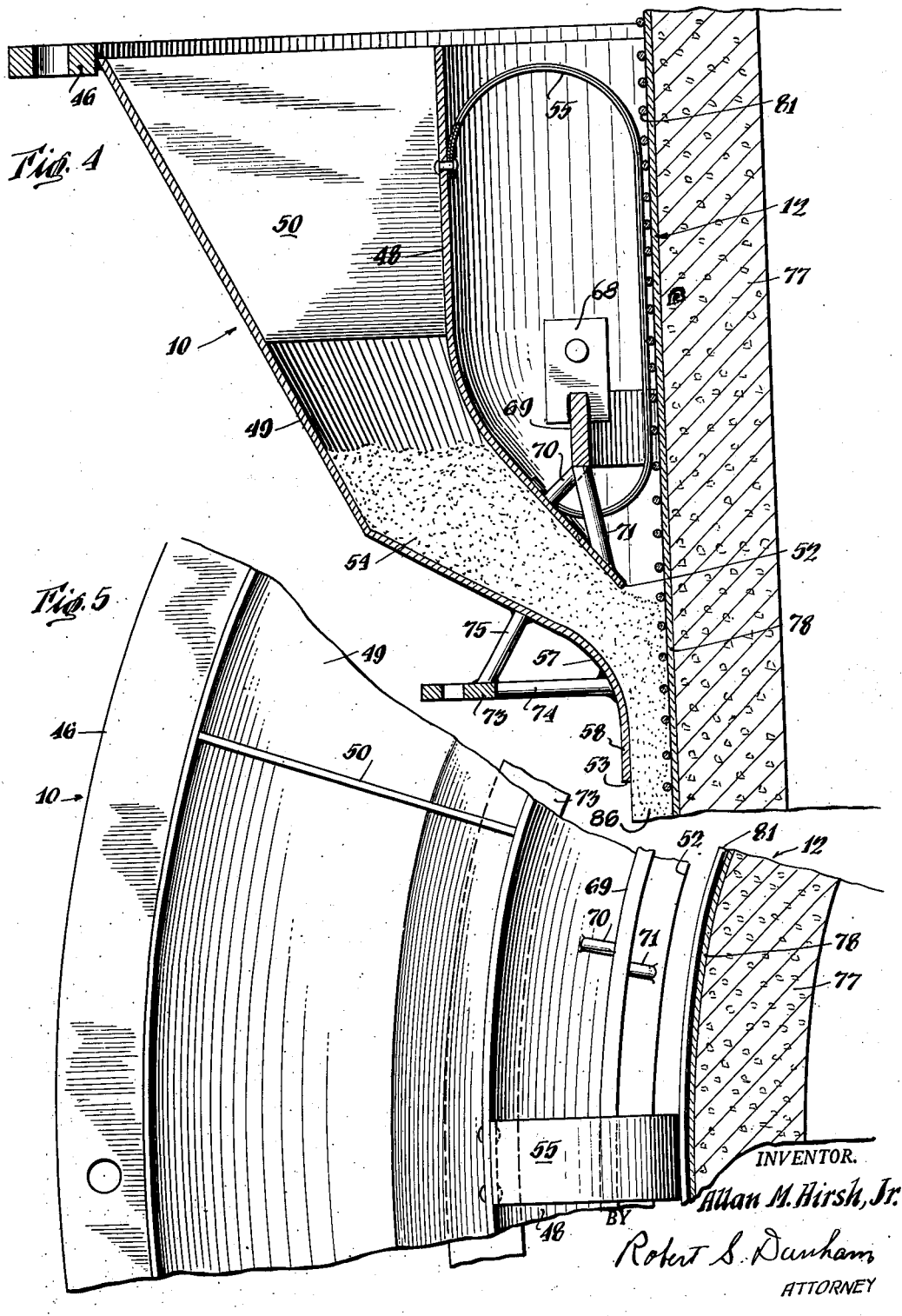

Aug. 5, 1952   A. M. HIRSH, JR   2,605,533
APPARATUS FOR APPLYING A CONTINUOUS LAYER OF CEMENTITIOUS
MATERIAL TO THE SURFACE OF A VERTICAL STRUCTURE
Filed May 20, 1950   4 Sheets-Sheet 4
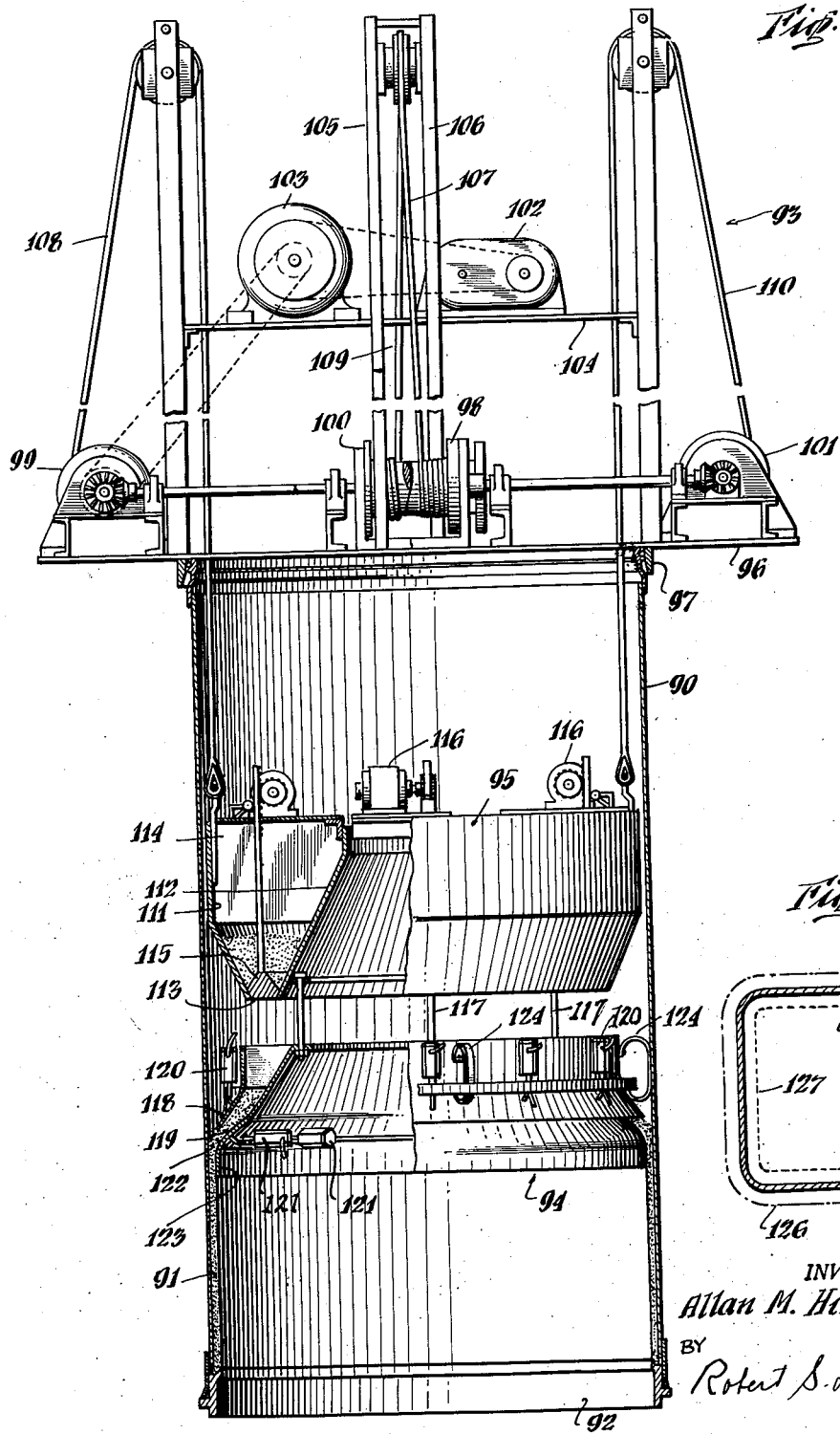
INVENTOR.
Allan M. Hirsh, Jr.
BY
Robert S. Dunham
ATTORNEY Patented Aug. 5, 1952

2,605,533

UNITED STATES PATENT OFFICE 2,605,533

APPARATUS FOR APPLYING A CONTINUOUS LAYER OF CEMENTITIOUS MATERIAL TO THE SURFACE OF A VERTICAL STRUCTURE

Allan M. Hirsh, Jr., Montclair, N. J., assignor to Lock Joint Pipe Company, East Orange, N. J., a corporation of New Jersey Application May 20, 1950, Serial No. 163,161

8 Claims. (Cl. 25—38)

This invention relates to an apparatus for applying a continuous coating of cementitious material or mortar to a substantially vertical surface of a core. The surface to be coated is defined as a surface traced by a straight line moving parallel to a fixed straight line or axis, as, for example, a cylindrical surface, or the surface of any other body or core having a substantially uniform cross section. The process applies an endless sleeve-like layer or band of cementitious material of uniform thickness against the surface. The coating is applied progressively. Starting from a lower portion of the core a layer in the form of an endless band is initially applied to the surface of the core and the band is widened in a direction parallel to the axis of the core to form a continuous layer free from joints and irregularities. The layer is bonded to the surface of the core as it is formed.

The cementitious material is consolidated and applied in such dense form as to be self-sustaining and resistant to deformation or displacement immediately following the passage of the applying apparatus. The method and apparatus may be used to apply a monolithic coating or layer of cementitious material on the surface of a solid body, or on the outside or inside surfaces of a hollow core.

The coating apparatus includes a coating hopper opening upwardly for receiving cementitious material. The lower portion of the hopper has concentric walls which together form a discharge opening located opposite the surface to be coated and so formed as to direct the cementitious material against the surface. The cementitious material is uniformly applied over the full lateral extent of the peripheral surface of the core owing to the continuity of the discharge opening around the core. The coating is initially formed in an endless band of predetermined thickness and is extended lengthwise of the axis of the core by moving the locus of application of the cementitious material as determined by the discharge opening of the hopper.

The cementitious mix contains little more moisture than is necessary to produce the chemical action required for hardening. The consistency of the mix is such that its inherent workability is of a low order. It is rendered workable and consolidated for the purposes of the present invention under the influence of vibrations applied at high frequency. Vibrators are attached to the opposite walls of the coating hopper in the region of its discharge opening. The vibration effects reduction of the internal friction between the particles of the mix for attaining its most flowable condition just prior to its application to the surface of the core.

The wall of the coating hopper furthest from the surface to be coated has a lower portion which is displaced axially of the core from the lower edge of the wall of the hopper which is more proximate to the surface of the core. The lower portion of the more remote wall firmly bonds the cementitious material to the surface of the core.

A feed hopper is employed to supply the mix to the coating hopper as it is needed. Since the coating is applied as the apparatus is moved axially of the core, different sizes of cores can be coated at the same rate of speed. Coatings have been commonly applied by projecting a stream of mortar against the surface of a core as the core is rotated and the projecting device is moved longitudinally thereof. In such methods the coating of large diameter cores requires more time than the coating of cores of smaller diameter.

The hoppers are suspended from overhead by cables fastened to winches which are operated at a uniform rate to elevate the hoppers as the coating is extended axially of the core.

In the drawing, Fig. 1 is a vertical view illustrating an apparatus embodying the invention with parts broken away;

Fig. 4 is a vertical section of the coating hopper shown in Fig. 1;

Fig. 5 is a partial view of the same coating hopper as viewed from above;

Fig. 6 is a vertical view illustrating the application of the invention for coating the inside surface of a hollow core; and Fig. 7 illustrates a form of non-circular hollow core whose inner and outer surfaces may be coated by employing the principle of the present invention.

Figure 1:
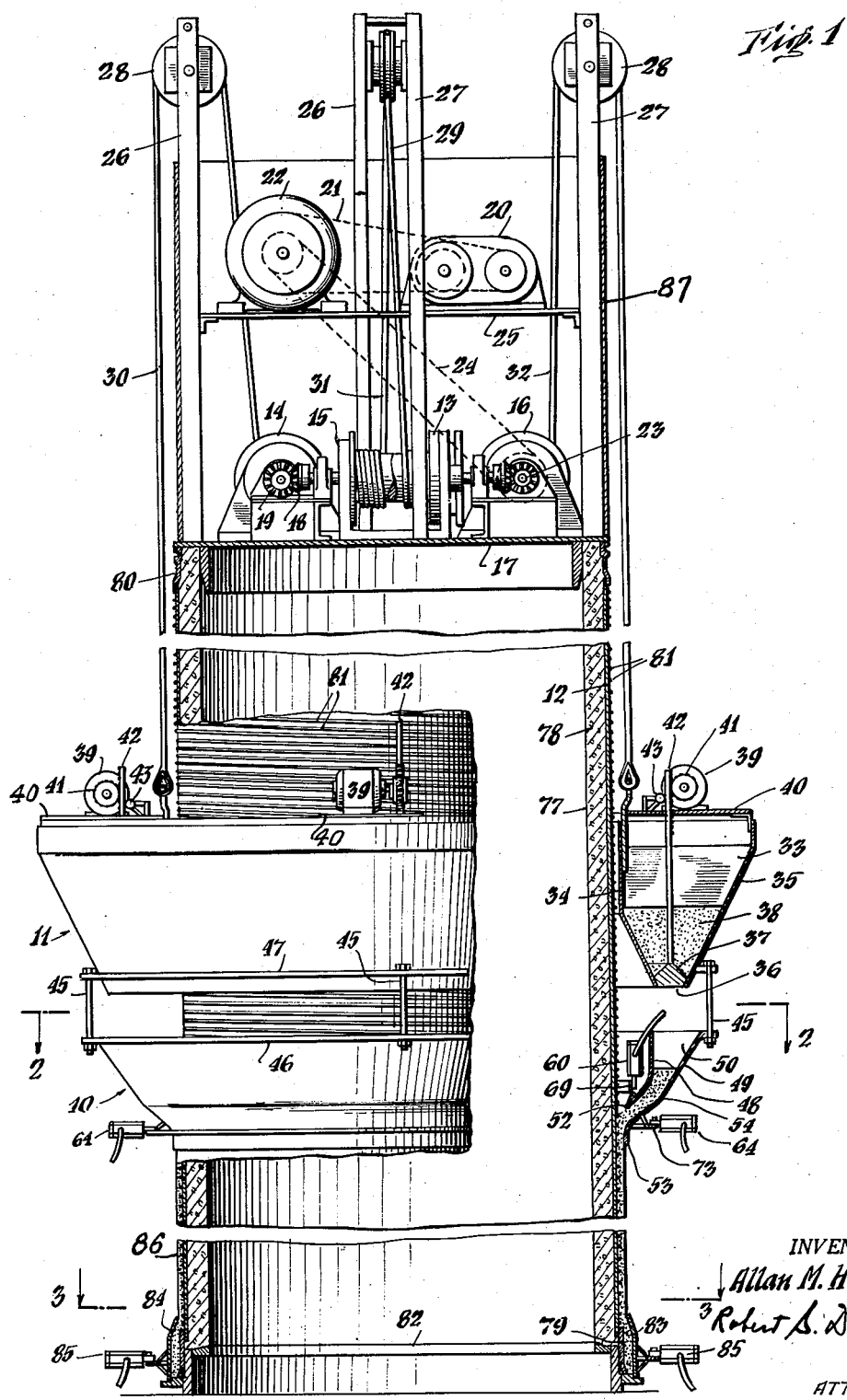
Figure 2:
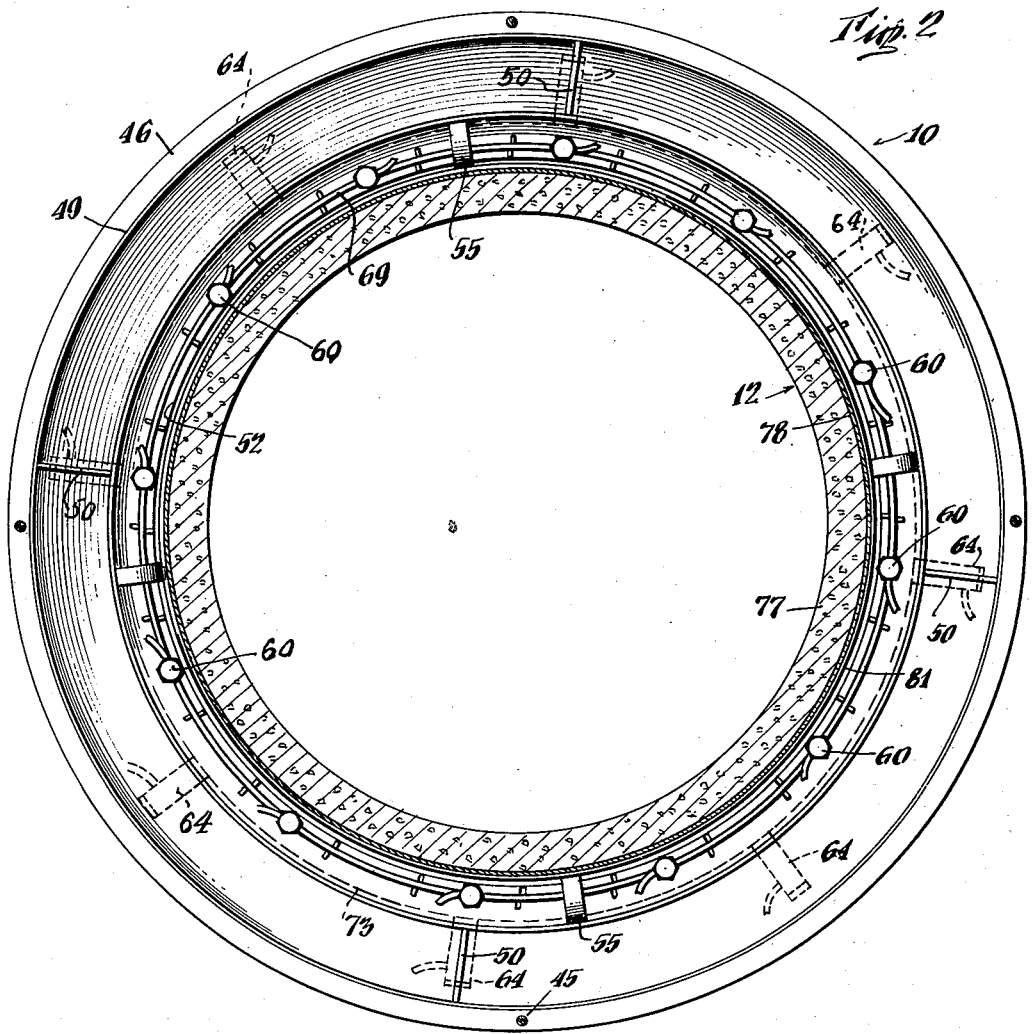
Fig. 2 is a horizontal section of line 2—2 of Fig. 1.
Figure 3:
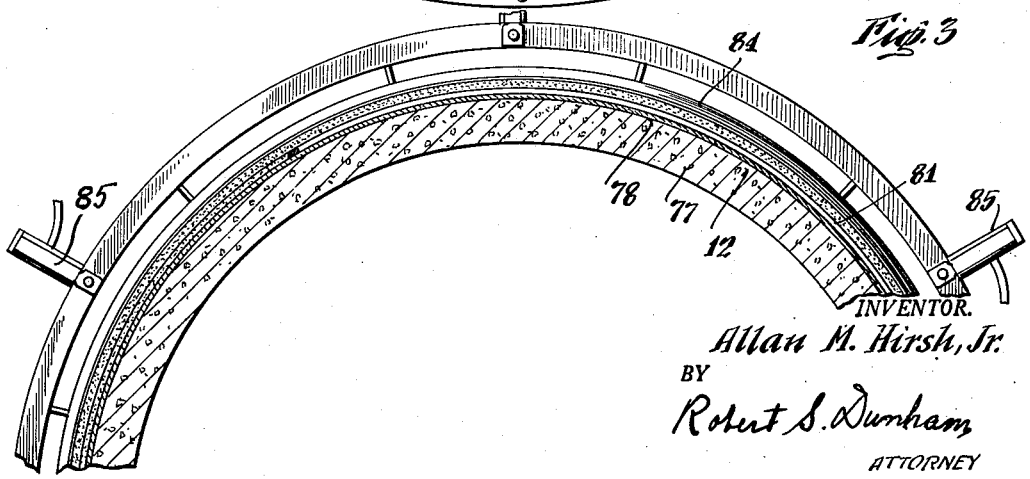
Fig. 3 is a partial horizontal section on line 3—3 of Fig. 1.

The method and an apparatus for applying a coating of cementitious material to a surface of a core are illustrated in Figs. 1 and 6. Referring to Fig. 1, the apparatus comprises an annular coating hopper 10 and an annular supply hopper 11 which encircles the core or other body 12 to which a coating is to be applied. The particular apparatus referred to is circular because of the cylindrical section of the core but it is intended that the form of the apparatus be such as to be concentric with and otherwise conform to the cross-section of the body to which the coating is to be applied.

The two hoppers 10 and 11 are supported from cables which are attached to winches by which the hoppers are progressively elevated as the coating is extended parallel to the axis of the core. As illustrated in Fig. 1, there are four winches 13, 14, 15 and 16. These winches are mounted on a platform 17 which is conveniently supported on the upper end of the core. The winches are connected to rotate together by means of four pairs of beveled gears similar to the gears 18 and 19. The winches are driven by a variable speed motor 20 which is connected by a belt 21 to a speed reducer 22, which in turn drives the shaft 23 of one of the winches through a belt connection 24. The driving and speed controlling mechanism is mounted upon a platform 25, which is supported above the platform 17 by means of pairs of standards, such as are shown at 26 and 27, Fig. 1. A pulley 28 journalled on each pair of standards for guiding the four cables 29, 30, 31 and 32 that are connected between the respective winches 13, 14, 15 and 16 and the supply hopper 11. Any desired number of these winches and cables may be provided depending upon the size of the cross-section of the core which is to be coated.

The supply hopper 11 has concentric walls 34 and 35 with portions converging to provide a discharge opening 36. Walls 34 and 35 of the supply hopper are rigidly connected together by a plurality of transverse panels 33. These walls and the discharge opening extend concentrically about the core. The supply hopper 11 is provided with a valve 37 in the form of a ring which is displaceable for permitting the feed of cementitious material 38 through the discharge opening. For controlling the movement of the valve 37 a plurality of motors 39 are provided which are equi-spaced around the hopper. Each motor is supported on an individual platform 40 which is fastened to the supply hopper. Each motor is provided with a gear 41 which meshes with a rack on a rod 42 to which the valve 37 is attached. A backing-up roller 43 maintains each gear and rack in mesh. The motors 39 are electrically coordinated in order to act uniformly to control the movement of the valve 37.

The coating hopper 10 is supported from the supply hopper 11 by means of a plurality of rods 45 which are secured to rings 46 and 47 secured to the respective hoppers.

The coating hopper 10 is formed by concentrically arranged walls 48 and 49 which are spaced from each other by a plurality of separating panels 50 which are distributed around the hoppers. The wall 48 is the most proximate to, and the wall 49 is most remote from the surface to be coated. The coating hopper opens upwardly to receive cementitious material from the supply hopper and the walls thereof converge downwardly and towards the surface of the core to be coated.

The discharge opening of the hopper 10 is formed by the lower edge 52 of the wall 48 and by the lower edge 53 of the wall 49 of the hopper, as best seen in Fig. 4. The edge 53 is in effect a trailing edge because the hopper is progressively moved upwardly during a coating operation and the lower edge of the more remote wall 49 is the last of the edges 52 and 53 to have contact with the coating material 54 being applied to the core. The edges 52 and 53 define the limits of the discharge opening of the hopper. The opening faces the surface of the core and is disposed angularly with respect thereto with the trailing edge 53 spaced from the surface a distance corresponding to the thickness of the layer desired.

The hopper and the edges 52 and 53 are maintained in spacial relationship to the surface of the core by means of a plurality of members which may be in the form of resilient elements 55 attached to the wall 48 of the hopper at uniform intervals around the hopper. These elements 55 may assume any convenient form so long as they are adapted to serve as guides for correctly centering the hopper with respect to the surface of the core.

The remote wall 49 is shaped in such a manner as to facilitate the movement of the cementitious material 54 towards and into compacting relationship with the surface of the core. To further this action the wall 49 has a convex conical portion 57 which acts as a ramp that merges into a cylindrical or substantially cylindrical portion 58 terminating in the trailing edge 53.

The cementitious material preferably is relatively dry and stiff and has a conistency of approximately zero when compared with the ordinary concrete slump test. A suitable mix comprises cement, mineral dust, fine sand, gravel and water. The movement of the cementitious material through the coating hopper is assisted by vibrations of high frequency. These vibrations are imparted to the walls of the coating hopper in the vicinity of the discharge opening. A plurality of vibrators are distributed around both of these walls at such spacing as to provide the intensity of agitation required to make the mix flowable through the hopper. In the apparatus illustrated there are twelve vibrators 60 distributed around the wall 48 and eight vibrators 64 distributed around the wall 49 in the region of the lower marginal edges of the hopper, but it is to be understood that the number of vibrators may be increased or decreased depending upon their power and frequency and the cross-sectional shape and area of the core which is to be coated. While any suitable conventional type of high frequency vibrator may be used, satisfactory results have been obtained with pneumatically actuated vibrators operated at a frequency ranging from about 150 to about 200 cycles per second. They are so mounted as to agitate the cementitious material entirely around the coating hopper.

The vibrators which act upon the wall 48 are rigidly mounted on supporting members 68 attached to a ring 69. They are so erected as to direct the vibrations in the axial direction of the ring and to a portion of the wall 48 adjacent the discharge edge 52. The ring 69 is rigidly supported by a plurality of sets of struts 70 and 71 which are welded to the ring 69 and to the wall.

The vibrators 64 which vibrate the wall 49 in the vicinity of the trailing edge 53 are rigidly supported on a ring 73 which surrounds the hopper. The ring 73 is rigidly attached to the wall 49 by sets of struts, each set including a horizontal strut 74 and an inclined strut 75. The struts 74 transmit vibration to the lower wall portions 57 and 58, and the struts 75 transmit vibration to the sloping portion of the wall 49. The vibrators 64 are attached to the ring 73 in such a manner that their directions of vibrations lie in the plane of the ring 73. The vibration of the wall portion 58 compacts the cementitious material against the surface of the core in a dense form.

It is apparent that the apparatus hereinabove described is useful for applying a layer or coating of cementitious material to the exterior surface of a variety of structures such as pipes, columns, piles, tanks and collapsible shells.

The structure illustrated in Figs. 1 to 5, inclusive, consists of a pipe core having a hardened concrete lining 77, a cylindrical steel sleeve 78, and bell and spigot rings 79 and 80 fastened to the steel cylinder (Fig. 1). A tensioned wire winding 81 is helically wrapped around the sleeve. The pipe is supported on a base ring 82. For coating a core of this type, a coating 83 may be applied over the bell ring before the coating apparatus is put into operation. This may be done in any manner desired. In the drawing, Fig. 1, the coating 83 is applied between the bell ring 79 and an outside moulding ring 84. Cementitious material is placed between the two rings and firmly tamped into place. The moulding may be assisted by employing a plurality of vibrators 85 which are attached to the moulding ring 84.

When the core or pipe has been prepared, the coating and supply hoppers are placed in a position in which the lower wall 58 of the coating hopper is opposite the area of the core where the coating is first to be applied. The coating hopper is filled with a ring-like mass of cementitious material. The vibrators carried by the coating hopper are operated and the apparatus is progressively raised for forming the coating 86. The rate of movement of the coating hopper is controlled by the variable speed motor 20. The cementitious material, upon leaving the trailing edge 53 of the hopper and the influence of vibration, sets very hard to the touch and remains as a hard and dense coating. The coating is thoroughly compacted against the surface of the core and completely encases the wire wrapping so firmly as to leave no voids at the under side of the tensioned wire. The coating 86 is trowelled smooth by the wall portion 58.

In order to provide a wall surface above the core which is coextensive with the surface of the core a collar 87 is mounted on the platform 17. The collar cooperates with the guide members 55 on the coating hopper to centralize the hopper during the coating of the surface area of the core adjacent its upper end.

The process for applying a layer or coating to a core is a continuing process which continues so long as material is supplied to the coating hopper, and with the apparatus of the present invention, it is possible to coat a complete length of pipe by progressively advancing the coating apparatus without interruption. The process may also be used for making concrete pipe by applying a plastic mix of cementitious material over a collapsible core or shell which can be removed when the material has set.

Fig. 6 illustrates an apparatus for coating the inside surface of a hollow core. The core 90 is illustrated as a tubular shell or sleeve to which an interior coating 91 is being applied. The core is mounted on a base 92 which supports the core with its axis extending vertically. The hoisting mechanism 93, by which the coating hopper 94 and the material supply hopper 95 are moved upwardly along the inner wall of the core, is similar to the hoisting mechanism previously described. It may be mounted on its own supports, or it may be mounted upon the upper end of the core 90, as illustrated in Fig. 6.

The hoisting mechanism includes a ring-like platform 96 having a depending flange 97 which centers the platform on the upper end of the core. The platform 96 has a central opening through which the supply hopper 95 and the upper portion of the coating hopper 94 may be raised towards the conclusion of the coating operation. Four winches 98, 99, 100 and 101 are uniformly distributed around the core and connected together by shafts and gearing. The operation of the winches is controlled by the variable speed motor 102 and the speed reducer 103 which is belted to one of the winch shafts. The motor and the speed reducer are mounted on a platform 104 which is supported by a plurality of pairs of standards 105, 106, extending upwardly from the ring-shaped platform 96. The sheaves operate cables 107, 108, 109 and 110 from which the coating apparatus is suspended.

The supply hopper 95 is formed by two opposite walls 111 and 112 which converge toward their lower edges to provide a tubular discharge opening 113. The suspending cables are attached to the wall 111, and the wall 112 is rigidly connected to the wall 111 by a plurality of radially extending panels 114. The valve ring 115 is actuated by a plurality of motors 116 to control the position of the valve ring and to regulate the rate of discharge of cementitious material from the supply hopper 95 to the coating hopper 94.

The coating hopper 94 is suspended from the supply hopper by a plurality of rods 117. The coating hopper functions similarly to the one previously described with reference to Fig. 1. It includes two opposite walls 118 and 119 which are concentric to the inner surface of the core. The walls 118 and 119 correspond to the walls 48 and 49, respectively, of the coating hopper 10 (Fig. 1), but are so formed as to provide a tubular discharge opening facing outwardly towards the inner surface of the core instead of inwardly. In Fig. 6, the wall 119 is the wall which is more remote from the surface of the core being coated than the wall 118.

The wall 118 has attached to the lower portion thereof a set of vibrators 120, and another set of vibrators 121 is attached to the lower portion of the wall 119. These vibrators function similarly to the vibrators previously described to effect the application of the cementitious material 122 against the inner surface of the core. The vibrators 121 impart a high frequency of vibration to the trowelling portion of the wall 119 opposite which the cementitious material is applied against the surface of the core in an endless band. The thickness of the layer of cementitious material is determined by the spacing of the wall portion 123 of the coating hopper from the inner surface of the core. The coating hopper is maintained concentric with the inner surface of the core by means of a plurality of spacing devices 124 which are mounted on the wall 118. The method for coating the inner surface of a hollow core is the same as for coating an outer surface.

The apparatus is adaptable for coating non-cylindrical bodies, as well as pipes and other cylindrical bodies. For example, a rectangular body 125 having a cross-section, such as is schematically illustrated in Fig. 7, may be coated with an outside coating 126 and an inside coating 127.

What is claimed is:

1. Apparatus for applying a continuous layer of cementitious material to a substantially vertical surface of a core having a substantially uniform cross section, comprising a hopper for containing cementitious material, said hopper having opposite walls arranged one within another with lower edges which are displaced vertically with respect to each other and constitute the marginal edges of a tubular discharge opening concentric to the surface of said core, means secured to each of said walls and holding said walls in spaced relationship, means for vibrating said walls, and means for raising said hopper alongside the surface of said core.

2. Apparatus for applying a continuous layer of cementitious material to a substantially vertical surface of a core having a substantially uniform cross section, comprising a hopper for containing cementitious material, said hopper having opposite walls with lower portions thereof extending towards the said surface of said core and terminating in lower edges forming a tubular discharge opening, one of said walls being more proximate to the surface of said core than the other of said walls and the more remote of said walls having a substantially cylindrical portion extending beyond the lower edge of the more proximate wall, means secured to each of said walls and holding said walls in spaced relationship, means attached to said walls for vibrating the same, and means for raising said hopper alongside the surface of said core.

3. Apparatus for applying a continuous layer of cementitious material to a substantially vertical surface of a core having a substantially uniform cross section, comprising a hopper for containing cementitious material, said hopper opening upwardly for receiving cementitious material and having a tubular discharge opening for directing the flow of cementitious material from the hopper against the surface of said core in an endless band, said hopper having opposite walls with lower portions thereof extending towards the said surface of said core and terminating in lower edges forming said discharge opening, one of said walls being more proximate to the surface of said core than the other of said walls and the more remote of said walls having a ramp-like portion merging into a substantially cylindrical portion adjacent its lower edge, a set of vibrators attached to each of said walls, said vibrators of each set being spaced around said walls adjacent said discharge opening, and means for raising said hopper alongside the surface of said core.

4. Apparatus for applying a continuous layer of cementitious material to a substantially vertical surface of a core having a substantially uniform cross section, comprising a hopper for containing cementitious material, said hopper opening upwardly for receiving cementitious material and having a tubular discharge opening for directing the flow of cementitious material from the hopper against the surface of said core in an endless band, said hopper having concentric walls with lower portions extending towards the said surface of said core and terminating in marginal edges of said discharge opening, means supporting a set of vibrators in spaced relation laterally around one of said walls, means supporting a second set of vibrators in spaced relation laterally around the other of said walls, said sets of vibrators being so located as to apply vibration to the lower portions of said walls, and means for raising said hopper as cementitious material is discharged from said discharge opening in an endless band against the surface of said core.

5. Apparatus for applying a continuous layer of cementitious material to a substantially vertical surface of a core having a substantially uniform cross section, comprising a coating hopper for containing and distributing cementitious material, said coating hopper opening upwardly for receiving cementitious material and having opposite walls with lower edges displaced vertically with respect to each other and terminating in marginal edges of a tubular discharge opening, a supply hopper for supplying cementitious material to said coating hopper, means supporting said coating hopper from said supply hopper, means for controlling the rate of flow of cementitious material from said supply hopper to said coating hopper, and means for raising said hoppers along the surface of said core.

6. Apparatus for applying a continuous layer of cementitious material to a substantially vertical surface of a core having a substantially uniform cross section, comprising means for containing and distributing cementitious material in a band extending laterally around the surface of said core, hoisting mechanism mounted above said core, cables extending from said hoisting mechanism to said distributing means for supporting said distributing means, a collar mounted above said core and having a wall surface substantially coextensive with said surface of said core, and means carried by said distributing means for cooperating with the surface of said collar to centralize said distributing means with respect to said surface of the core during the coating of the surface area of the core adjacent the upper end of the core.

7. Apparatus for applying a continuous layer of cementitious material to a substantially vertical surface of a core having a substantially uniform cross-section and wherein the cementitious material is a relatively dry and stiff mix having a consistency of approximately zero when compared with the ordinary concrete slump test, comprising a hopper having an annular wall adjacent to said vertical surface and a more remote annular wall, said walls converging downwardly and providing a lower discharge opening facing said surface for directing material to said surface, means connecting said walls together, means for vibrating one of said walls, and means for raising said hopper alongside said surface.

8. Apparatus for applying a continuous layer of cementitious material to a substantially vertical surface of a core having a substantially uniform cross-section and wherein the cementitious material is a relatively dry and stiff mix having a consistency of approximately zero when compared with the ordinary concrete slump test, comprising a hopper formed by annular walls converging downwardly towards a discharge opening adjacent said vertical surface, one of said walls being more remote from said surface than the other of said walls and having a portion thereof located opposite said discharge opening and providing a marginal edge which constitutes a trailing edge for said hopper, said trailing edge being spaced from said surface a distance equal to the thickness of a layer of cementitious material to be applied to said surface, means for vibrating said trailing edge, and means for raising said hopper to cause the application of a continuous layer of cementitious material to said surface.

ALLAN M. HIRSH, Jr.

REFERENCES CITED

The following references are of record in the file of this patent:

UNITED STATES PATENTS

| Number | Name | Date |
|---|---|---|
| 2,053,307 | Wilson | Sept. 8. 1936 |
| 2,225,015 | Lebelle | Dec. 17, 1940 |